Patented Nov. 4, 1952

2,616,926

UNITED STATES PATENT OFFICE 2,616,926

MANUFACTURE AND RECOVERY OF DIAROYL-DIAMINO-DISULFO-STILBENES

Robert A. Bernard, Upper Darby, Pa., assignor to E. I. du Pont de Nemours and Company, Wilmington, Del., a corporation of Delaware No Drawing. Application December 7, 1949, Serial No. 131,697

4 Claims. (Cl. 260—507)

This invention relates to a process for the manufacture of methoxy substituted dibenzoyl-diamino-stilbene disulfonates, and is concerned particularly with the recovery of said compound from its reaction mass.

In U. S. P. 2,497,131, issued to Lubs et al., a process is described and claimed for synthesizing compounds of the aforegoing type by reacting together 4,4'-diamino-stilbene-2,2'-disulfonic acid, a benzoic acid possessing one or more methoxy groups, and phosphorus oxychloride in a liquid organic medium containing a tertiary base selected from the group consisting of dimethyl-cyclohexylamine, diethyl-cyclohexylamine, tributylamine, quinoline and pyridine. The patent recommends also the use of an inert organic liquid, such as xylene, as a diluent, but specifies that the quantity of tertiary base employed should be sufficient to neutralize the two sulfonic acid groups of the stilbene compound and to absorb any acid split off in the reaction. It is also taught there that the quantity of tertiary base may exceed this theoretical minimum, and it is easy to conceive from the above teachings a process wherein the entire liquid medium consists of pyridine. Nevertheless, pyridine being a relatively expensive reagent, the question of its recovery or waste plays an important role in the economy of the entire process.

Accordingly, my present invention seeks to improve the economy of the aforegoing modified process of Lubs et al. by arranging the recovery of the condensation product in such a manner as to recover simultaneously the bulk of the pyridine.

A further object of this invention is to provide an economical and efficient method for converting said product into its disodium salt and for isolating the latter without wasting the pyridine. Other useful objects of this invention will appear as the description proceeds.

Now according to my invention, the reaction mass obtained in said modified pyridine process is blown with anhydrous gaseous ammonia. This decomposes the pyridine salt of the condensation product, forming in lieu thereof the relatively insoluble ammonium salt, and releases pyridine from any other salts thereof formed in the reaction mass.

From the resulting slurry of the diammonium sulfonate in pyridine, the latter may be removed by distillation in any convenient manner, for instance by transferring the mass to a vacuum graining bowl, where the entire mass is subjected to continuous grinding and agitation while the pyridine is distilled off under vacuum. Or the mass may be filtered in any suitable manner, followed by washing the filter cake with an organic liquid such as methyl-ethyl ketone, which boils very much below pyridine. From the combined filtrates and washings, the pyridine and low-boiling liquid may then be readily separated by distillation at two different temperature levels. Or again, a third mode of operation may be applied, substantially as follows:

To the slurry of ammonium salt of the reaction product in pyridine is added a high boiling solvent such as o-dichlorobenzene. Pyridine and some of the o-dichlorobenzene are then distilled off under reduced pressure, and collected in two or more fractions. The fractions may be subjected to further distillation and fractionation, to separate the pyridine from the o-dichlorobenzene or they be saved for re-use directly. There remains in the still a slurry of ammonium salt in o-dichlorobenzene. The mass is subjected to steam distillation to remove the remainder of o-dichlorobenzene, leaving an aqueous slurry of ammonium salt. This is made alkaline to Clayton Yellow with sodium or potassium hydroxide to convert the condensation product to an insoluble dialkali-metal salt, which is filtered off, washed with brine to remove inorganic salts and by-products, and dried. An alternative method of converting the ammonium salt of the dye to an alkali-metal salt consists of using sodium carbonate either during the steam distillation step or immediately following this operation.

In the first mentioned two methods, the isolated diammonium salt of the condensation product may likewise be converted into the disodium salt by treatment with aqueous sodium hydroxide until alkaline to Clayton Yellow. This incidentally is a very remarkable transformation, inasmuch as both the diammonium salt and disodium salt are in solid state in the aqueous mass under the above conditions.

Without limiting my invention, the following examples will illustrate my mode of operation. Parts mentioned are by weight.

Example 1

38.2 parts of 4,4'-diaminostilbene-2,2'-disulfonic acid and 44.8 parts of 2,4-dimethoxybenzoic acid were added to 221 parts of pyridine and stirred at room temperature. 22.6 parts of phosphorus oxychloride were added and the mass was heated to reflux. The mass was refluxed for 1.75 hours until free from primary amine as shown by diazotizing a test sample and coupling same with R-salt in alkaline solution. A purple color indicates presence of unreacted diamino-disulfo-stilbene.

Dry ammonia gas was then passed into the reaction mass at 100° C. for 1 hour. A thick yellow precipitate was formed. 326 parts of o-dichlorobenzene were added, and the pyridine was distilled off under diminished pressure (50 to 100 mm.). 30 parts of sodium carbonate were then added to the still residue and the o-dichlorobenzene was then steam distilled while feeding water into the mass to keep it at constant volume. The still contents were then cooled to 25°–30° C., and the condensation product was collected by filtration. Sodium 4,4'-bis-(2,4-dimethoxybenzoylamino) - stilbene-2,2'-disulfonate was obtained in essentially theoretical yield.

*Example 2*

37.5 parts of 4,4'-diaminostilbene-2,2'-disulfonic acid and 47.7 parts of 2,4,5-trimethoxybenzoic acid were added to 221 parts of pyridine and stirred. 24.5 parts of phosphorus oxychloride were then added and the whole refluxed for 2 hours.

The reaction mass was worked up as in Example 1, giving sodium 4,4'-bis-(2,4,5-trimethoxybenzoylamino)-stilbene - 2,2' - disulfonate in excellent yield.

*Example 3*

To a mixture of 438 parts of pyridine, 74 parts of 4,4'-diamino-stilbene-2,2'-disulfonic acid and 80 parts of 2,4-dimethoxybenzoic acid, 45 parts of phosphorus oxychloride were added while stirring. The reaction mass was then heated to reflux and kept there for 1 hour and 20 minutes. It was then cooled to 40° C., and dry ammonia gas was bubbled in. When NH$_3$ absorption ceased, the pyridine was recovered by distillation at reduced pressure. The dry residue was added to 400 parts of water containing 15 parts of sodium chloride and stirred. 200 parts of 30% sodium hydroxide solution were added, making the slurry alkaline to Clayton Yellow. The reaction product, sodium 4,4' - bis - (2,4 - dimethoxybenzoylamino)-stilbene-2,2'-disulfonate, was isolated by filtration, washed with 5% brine solution, and dried at 160° C.

*Example 4*

38.2 parts of 4,4'-diaminostilbene acid, 42.8 parts of 2,4-dimethoxy-benzoic acid, 220 parts of pyridine and 23.5 parts of phosphorus oxychloride were refluxed together for 1.5 hours, at the end of which time a test-sample showed no free amine. The mass was then cooled to 100° C., and ammonia gas was passed in for 1 hour, changing the reaction mass from a clear orange solution to a thick slurry of yellow crystals. The slurry was cooled to 10° C., blown with air for 10 minutes, and filtered. The filter cake was washed with methyl-ethyl-ketone and air-dried, yielding the diammonium salt of 4,4'-bis(2,4-dimethoxy - benzoylamino) - stilbene-2,2'-disulfonic acid in a state of high purity.

The filtrate, containing the pyridine and methyl-ethyl-ketone, was fractionally distilled, first removing the lower boiling ketone in pure form. The pyridine then distilled over at its boiling point in pure form and high recovery.

In lieu of methyl-ethyl-ketone in this example, acetone, methyl-alcohol or any other low-boiling, organic solvent which does not form an azeotrope with pyridine, may be employed for washing the pyridine out of the crystalline filter-cake. The separation of pyridine from this low-boiling solvent may then be effected as in the preceding paragraph.

In a similar manner, my invention may be applied to recovery of the condensation product obtained from 4,4'-diamino-disulfo-stilbene and any other methoxy benzoic acid, for instance, p-methoxy-benzoic acid, 2,3-dimethoxybenzoic acid, 2,5-dimethoxy-benzoic acid, 3,4-dimethoxybenzoic acid, 2,3,4-trimethoxy-benzoic acid, etc.

Other details may likewise be varied, within the skill of those engaged in this art.

I claim as my invention:

1. In a process of producing a polymethoxy-dibenzoyl-diamino-2,2'-disulfo-stilbene by reacting 4,4'-diamino-2,2'-disulfo-stilbene with a methoxy benzoic acid containing from 1 to 3 methoxy groups but no other substituents in the nucleus, and phosphorus oxychloride in a medium consisting essentially of anhydrous pyridine, the improvement which consists of separating the condensation product from pyridine by treating the reaction mass with anhydrous, gaseous ammonia in quantity sufficient to displace the pyridine from any salts formed in the reaction mass, and removing the pyridine by an anhydrous distillation process.

2. A process for producing a methoxy-substituted dibenzoyl diamino-disulfo-stilbene, which comprises reacting 4,4'-diamino-stilbene-2,2'-disulfonic acid with a methoxy-substituted benzoic acid containing from 1 to 3 methoxy groups but no other substituents in the nucleus, and phosphorus oxychloride in a medium consisting essentially of anhydrous pyridine, then treating the reaction mass with anhydrous, gaseous ammonia to displace pyridine from any salts thereof formed in the reaction, subjecting the reaction mass to direct distillation to remove the pyridine, and recovering the desired reaction product in the form of disodium salt from the residual mass by adding water and a sodium alkali.

3. A process of separating pyridine from a reaction mass containing the reaction product of 4,4' - diamino - 2,2' - disulfo - stilbene, a methoxy benzoic acid containing from 1 to 3 methoxy groups but no other substituents in the nucleus, phosphorus oxychloride and pyridine in a liquid, organic medium consisting essentially of anhydrous pyridine, which comprises treating said reaction mass with anhydrous, gaseous ammonia to displace pyridine from salts thereof contained in the reaction mass, adding o-dichlorobenzene to the reaction mass, distilling off pyridine under diminished pressure, and further distilling off a binary mixture consisting of pyridine and o-dichlorobenzene until all the pyridine has been removed.

4. A process of recovering the sodium salt of a polymethoxy-dibenzoyl-4,4'-diamino-stilbene-2,2'-disulfonic acid from a reaction mixture in which said compound has been synthesized in the form of dipyridinium sulfonate in a liquid medium consisting essentially of pyridine, which comprises treating said reaction mass with anhydrous, gaseous ammonia to liberate pyridine from the sulfonate groups and from other pyridinium salts formed in the reaction, adding o-dichlorobenzene, removing pyridine and a portion of said o-dichlorobenzene by distillation, steam distilling the residue to remove the remainder of said o-dichlorobenzene and to form in the residue an aqueous slurry of the diammonium sulfonate of said reaction product, adding sodium hydroxide to said aqueous slurry to displace the ammonia, and filtering off the disodium sulfonate of said polymethoxy-dibenzoyl-diamino-stilbene.

ROBERT A. BERNARD.

REFERENCES CITED

The following references are of record in the file of this patent:

UNITED STATES PATENTS

| Number | Name | Date |
|---|---|---|
| 2,076,217 | Albrecht | Apr. 6, 1937 |
| 2,156,821 | Schneider | May 2, 1939 |
| 2,170,262 | Graenacher | Aug. 22, 1939 |
| 2,186,769 | Schirm | Jan. 9, 1940 |
| 2,299,834 | Martin | Oct. 27, 1942 |
| 2,328,159 | Martin | Aug. 31, 1943 |
| 2,468,431 | Eberhart | Apr. 26, 1949 |

FOREIGN PATENTS

| Number | Country | Date |
|---|---|---|
| 451,956 | Germany | Nov. 1, 1927 |

OTHER REFERENCES

Chem. Ab., vol. 22, pg. 4134.